US012627692B2

(12) United States Patent
Maganu et al.

(10) Patent No.: US 12,627,692 B2
(45) Date of Patent: May 12, 2026

(54) AUTOMATIC RULE GENERATION FOR MALICIOUS INDICATORS BASED ON HISTORICAL DATA

(71) Applicant: CrowdStrike, Inc., Sunnyvale, CA (US)

(72) Inventors: Mihai Maganu, Stuttgart (DE); Andrei Stoian, Tulcea (RO); Ernest Szocs, Otopeni (RO); Paul Urian, Bucharest (IT)

(73) Assignee: CrowdStrike, Inc., Sunnyvale, CA (US)

( * ) Notice: Subject to any disclaimer, the term of this patent is extended or adjusted under 35 U.S.C. 154(b) by 0 days.

(21) Appl. No.: 18/655,597

(22) Filed: May 6, 2024

(65) Prior Publication Data

US 2025/0343812 A1      Nov. 6, 2025

(51) Int. Cl.
*H04L 9/40*            (2022.01)
(52) U.S. Cl.
CPC ...... *H04L 63/1425* (2013.01); *H04L 63/1416* (2013.01)
(58) Field of Classification Search
CPC ........................ H04L 63/1425; H04L 63/1416
See application file for complete search history.

(56) References Cited

U.S. PATENT DOCUMENTS 7,917,393 B2 * 3/2011 Valdes ................ H04L 63/1408
                                                     709/224
8,544,098 B2 * 9/2013 Gustave ................ G06F 21/577
                                                     709/224

(Continued)

FOREIGN PATENT DOCUMENTS

CN      112738036 A      4/2021
CN      113468532 A      10/2021

(Continued)

OTHER PUBLICATIONS

Strom, Blake E., et al. "Mitre att&ck: Design and philosophy." Technical report. The MITRE Corporation, 2018. (Year: 2018).*

(Continued)

*Primary Examiner* — Michael R Vaughan

(74) *Attorney, Agent, or Firm* — Womble Bond Dickinson (US) LLP

(57)            ABSTRACT

Malicious indicators rule generation using historical data is provided. A method includes receiving, from threat detection engines of a plurality of vendor systems, a plurality of threat detection indications for a dataset. Each threat detection indication of the plurality of threat detection indications receives a vendor-specific tokenization based on historical data associated with the plurality of vendor systems. The method further includes identifying, from the plurality of threat detection indications, a lead detection from a first vendor system of the plurality of vendor systems and an accuracy detection from at least one second vendor system of the plurality of vendor systems. The lead detection and the accuracy detection have overlapping data from the dataset. The method further includes generating, by a processing device, a malicious behavior detection procedure based on the lead detection, the accuracy detection, and the vendor-specific tokenization being used to detect a malicious behavior in dataset.

16 Claims, 8 Drawing Sheets

175

Vendor 1 | Vendor 2 | Vendor 3 | Vendor 4
102 | 104 | 106 | 108

Detection 1 112a'

Detection 1 114a'

Detection 1 118a'

Detection 2 118b

Accuracy Detection 122a

Lead Detection 120

Detection 3 118c

Accuracy Detection 122b

Detection 3 112c

Detection 4 118d

(56) References Cited

U.S. PATENT DOCUMENTS

| | | | |
|---|---|---|---|
| 9,438,620 B2 | 9/2016 | Aktas et al. | |
| 10,616,258 B2 * | 4/2020 | Liang | H04L 63/1433 |
| 11,418,536 B2 * | 8/2022 | Murphy | H04L 67/563 |
| 2014/0007238 A1 * | 1/2014 | Magee | G06F 21/577 |
| | | | 726/24 |
| 2020/0057953 A1 * | 2/2020 | Livny | G06N 5/048 |
| 2020/0162496 A1 * | 5/2020 | Medalion | H04L 63/1416 |
| 2020/0380136 A1 * | 12/2020 | Patel | G06F 21/577 |
| 2021/0203673 A1 * | 7/2021 | dos Santos | H04L 63/1433 |
| 2022/0116414 A1 * | 4/2022 | Peters | G06N 5/04 |
| 2023/0319098 A1 | 10/2023 | Berlin et al. | |
| 2024/0031392 A1 * | 1/2024 | Ahn | H04L 63/1416 |
| 2024/0283639 A1 * | 8/2024 | Thompson | H04L 9/3239 |

FOREIGN PATENT DOCUMENTS

| | | | |
|---|---|---|---|
| CN | 115714654 A | 2/2023 | |
| CN | 116821903 A | 9/2023 | |

OTHER PUBLICATIONS

Valdes, Alfonso, and Keith Skinner. "Probabilistic alert correlation." International Workshop on Recent Advances in Intrusion Detection. Berlin, Heidelberg: Springer Berlin Heidelberg, 2001. (Year: 2001).*

A. Iskhakov and S. Iskhakov, "Data Normalization Models in the Security Event Management Systems," 2020 13th International Conference "Management of large-scale system development" (MLSD), Moscow, Russia, 2020, pp. 1-5 (Year: 2020).*

Hurier et al., "Euphony: Harmonious Unification of Cacophonous Anti-Virus Vendor Labels for Android Malware", 11 pages.

Sebastian et al., "Avclass: A Tool for Massive Malware Labeling", 22 pages.

* cited by examiner

100

| Vendor 1 102 | Vendor 2 104 | Vendor 3 106 | Vendor 4 108 |
|---|---|---|---|
| Detection 1 112a | Detection 1 114a | Detection 1 116a | Detection 1 118a |
| Detection 2 112b | Detection 2 114b | Detection 2 116b | Detection 2 118b |
| Detection 3 112c | | | Detection 3 118c |
| | | | Detection 4 118d |

| Vendor 1 102 | Vendor 2 104 | Vendor 3 106 | Vendor 4 108 |
|---|---|---|---|
| Detection 1  112a' | | Detection 2 116b' | Detection 1 118a' |
| Detection 2 112b' | Next Lead Detection 220 | | Detection 2 118b |

FIG. 2

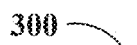

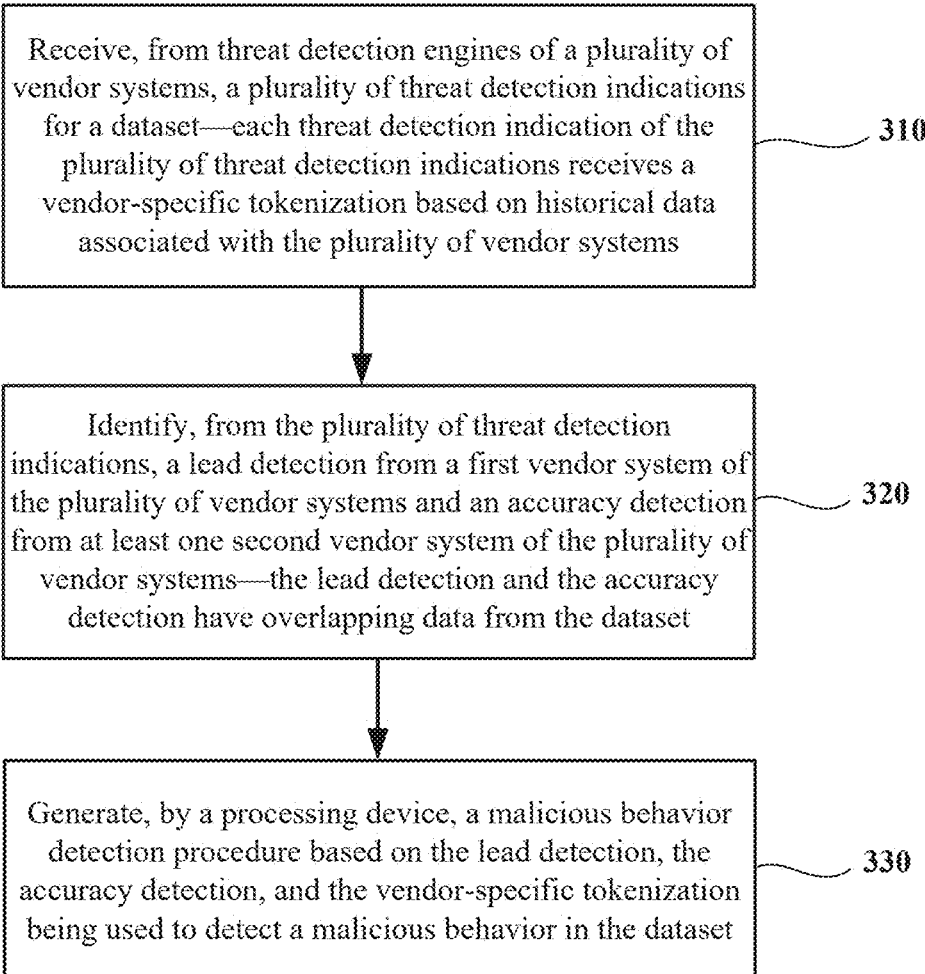

Receive, from threat detection engines of a plurality of vendor systems, a plurality of threat detection indications for a dataset—each threat detection indication of the plurality of threat detection indications receives a vendor-specific tokenization based on historical data associated with the plurality of vendor systems — 310

Identify, from the plurality of threat detection indications, a lead detection from a first vendor system of the plurality of vendor systems and an accuracy detection from at least one second vendor system of the plurality of vendor systems—the lead detection and the accuracy detection have overlapping data from the dataset — 320

Generate, by a processing device, a malicious behavior detection procedure based on the lead detection, the accuracy detection, and the vendor-specific tokenization being used to detect a malicious behavior in the dataset — 330

FIG. 3

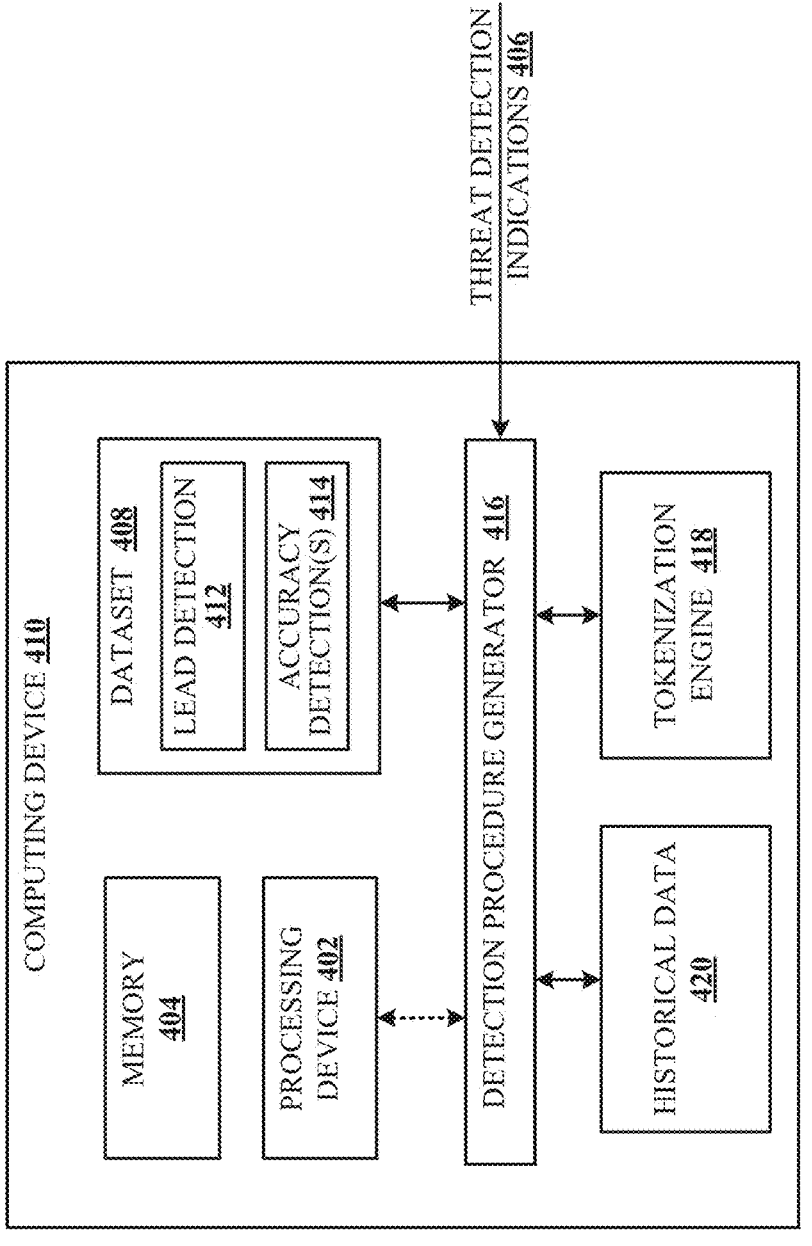
FIG. 4

AUTOMATIC RULE GENERATION FOR MALICIOUS INDICATORS BASED ON HISTORICAL DATA

TECHNICAL FIELD

Aspects of the present disclosure relate to threat detection in cyber environments, and more particularly to automatic rule generation for malicious indicators.

BACKGROUND

Being able to detect the presence of malicious actors in cyber environments is an important measure for safeguarding sensitive data and defending against potential cyberattacks. Detection of malicious actors also helps maintain trust and credibility among users of an application as well as maintain the reputation and business continuity of an organization that provides the software and/or service. Malicious actions may be in the form of ransomware, trojans, spyware, viruses, keyloggers, bots, and any other type of action that leverages software in a malicious manner to exploit another digital environment. Even small security breaches or incidents can have far-reaching implications on an organization's overall financial health. Thus, it is in the interest of software providers to implement technology that identifies and protects against threats from malicious actors.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

FIGS. 1A-1D are diagrams illustrating a plurality of threat detections indicated by a plurality of engines associated with a plurality of vendor systems.

FIG. 2 is a diagram illustrating a next threat detection analysis that may be implemented when a lead threat detection analysis is not suitable for malicious indicator rule generation.

FIG. 3 is a flow diagram of a method of automatic rule generation for malicious indicators.

FIG. 4 is a component diagram of an example of a device architecture for automatic rule generation for malicious indicators.

DETAILED DESCRIPTION

Figure 1B:
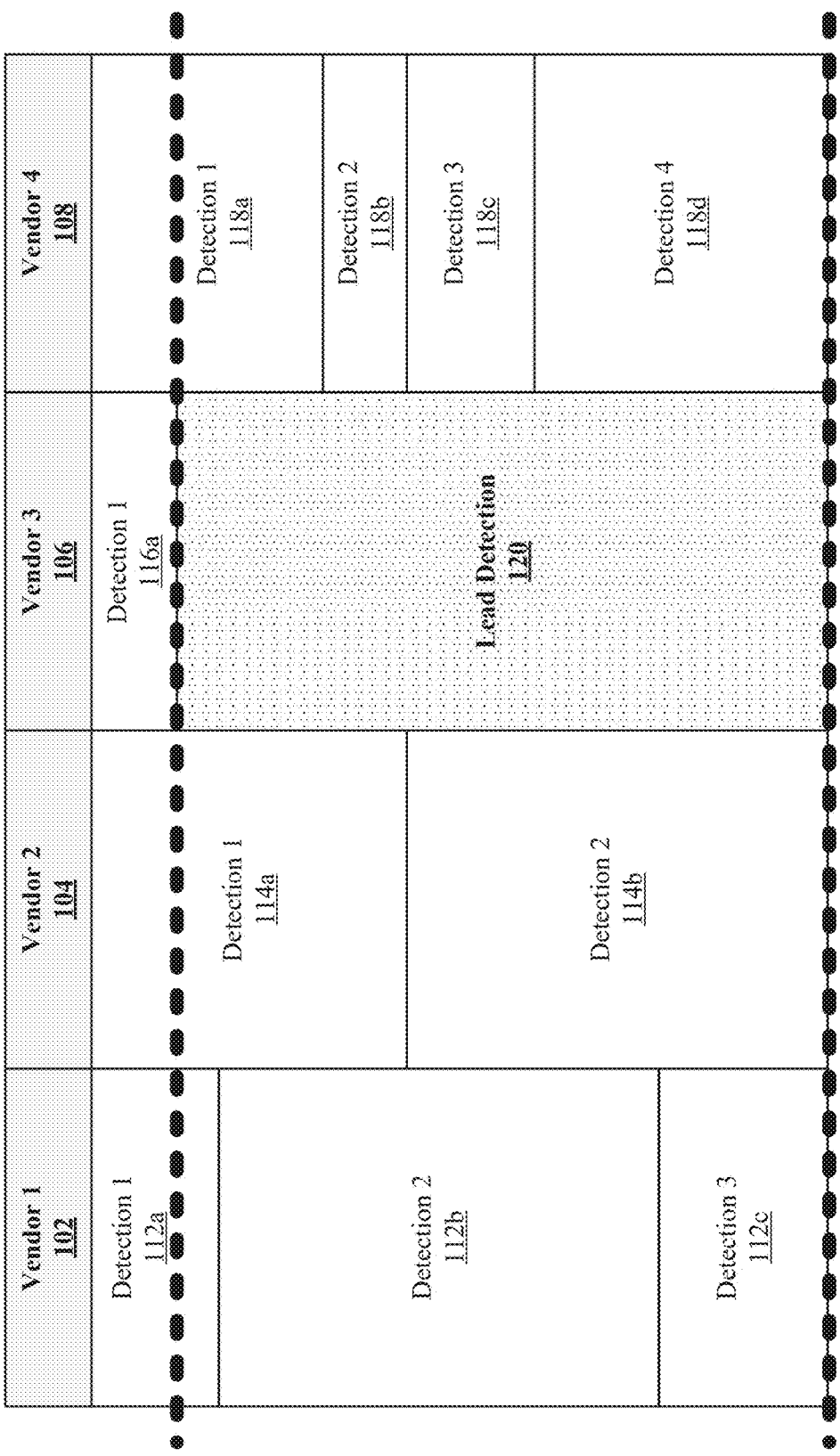

The presence of a malicious actor in a cyber environment has traditionally been detected through various detection engines. "Malicious actor", which may also be referred to as a threat actor or cyberthreat actor, can be an individual, group of individuals, application, code, etc., that intentionally causes harm to, or exploits vulnerabilities in, computer systems, digital devices, networks, software, and the like. Malicious actors oftentimes perpetrate cyberattacks via phishing techniques, ransomware, and other forms of malicious attacks, attempts, research, and/or unwanted actions/results.

Different security vendors commonly implement their own engine or set of engines to detect whether a malicious actor is present. For example, the different security vendors may identify certain behavior(s) relative to an application/code and map the certain behaviors to certain rules. Based on the mapping, the engine(s) can detect whether malicious or potentially unwanted actors/applications are attempting to compromise the application/code and may implement various procedures to thwart the intended actions of the malicious actor.

A problem that arises from different security vendors implementing different engines is that it becomes difficult to analyze the collective decision making of multiple vendors. Different security vendors may defend against cyberattacks from malicious actors using different schemes. For example, if the multiple vendors do not utilize a same naming convention for threat detection, two different detections by two different vendors could refer to the same threat, but by a different name. That is, the different engines of the different vendors may each generate their own (individualized) name for a detected threat based on the respective naming conventions used by each vendor, making it difficult for a third-party analyzer to determine that each vendor is referring to the same threat.

In other cases, the multiple vendors may classify the same detected threat into different categories. For example, a same Indicator of Compromise may be assigned by a first vendor to a Trojan family, but to a Ransomware family by a second vendor. In the case of automatically generated names by one or more of the vendors, where the names are not represented in a conventionally human readable form, such as text that is not in a natural language form, an analysis of the collective decision making of the multiple vendors may lead to threat analysis fatigue and/or uncertain ways to cluster similar threats. Reconciling the problems described herein provides the benefit of significantly reducing manual search time and reasoning of security analysts.

Technologies that address the above-described problems are either non-existent or use techniques that cause large performance penalties. For example, some technologies attempt to tokenize threat detections by splitting the detections into known words and counting the number of certain key threat indicators in the detection. However, this limited process is not expansive enough to link a threat detection to a particular Indicator of Compromise and also does not provide for any meaningful way to cluster the threats. While other technologies can meaningfully cluster some types of information based on file contents, performance penalties are orders of magnitude more severe when attempting to cluster threats based on batches of data that include thousands of files or more.

As discussed herein, the present disclosure provides an approach that improves the operation of a computer system by providing a way to identify threats among a large amount of information and with reduced performance penalties. As a result, threats from malicious actors can be more easily identified and with less processing power/computational complexity. Examples of the present disclosure include providing self-generated rules that identify threats using historical data, such that the identified threats may then be clustered with reduced performance penalties. In example embodiments, each detection is split into meaningful component parts and tokenized based on previous knowledge/data of potential threats. Meaningful component parts may include a modifier (e.g., operating system type, architecture), type (e.g., malware type Ransomware, Rootkit), family (e.g., family name of the threat), variant (e.g., versions or subversions of a particular family), amongst others. Tokenization may be performed differently for each vendor. For instance, each token may be provided a specific meaning depending on for which vendor the tokenization is being performed.

In further example embodiments, two top levels of clustering and multiple sub-levels of clustering may be implemented to output a single result. For the first level/top level, a lead engine is selected that includes most of the same family for a particular batch of files. At a second level, a variable number of accuracy engines are used to associate the cluster to a specific direction of threat, such that the clustering does not have an excessive amount of unnecessary noise in the data. A rule is generated based on combining these techniques. The rule can be used to further cluster future threats of a same kind in a manner that significantly reduces both clustering time and security analysis processing power.

FIGS. 1A-1D are diagrams 100, 125, 150, 175 illustrating a plurality of threat detections 112a-118d performed by a plurality of vendors 102-108. The collective decision making of multiple vendors 102-108 regarding malicious actors may be based on the use of different types of detection engines among the respective vendors 102-108. For example, vendor 1 102 may use a different detection engine than vendor 2 104. Likewise, vendor 3 106 and vendor 4 108 may each use a different type of detection engine from each other, as well as from vendor 1 102 and vendor 2 104. Thus, even if the engines provide an abundance of detection data, it may be difficult to interpret the data and correctly label distinct threats, as the different detection engines may identify threats based on different procedures.

In some cases, it may also be difficult to determine whether a certain detection represents a true threat or whether the detection is less significant, or even a false positive. When the different engines perform different labeling schemes, further challenges are created for implementing an automated labeling system among the vendors 102-108. Moreover, the labeling process may not be as simple as merely classifying every detection 112a-118d by every vendor 102-108 as a threat, due to accuracy issues associated with some vendor detections.

Each vendor 102-108 may use their own schema for threat detections. For example, a schema may include prefixes and/or suffixes indicating a platform on which a sample is targeted. In further examples, the schema may indicate a variant number, such as for cases where there are multiple variants of a threat. A detection may be associated with a family name, which is then used for clustering the threats. The different vendors 102-108 identifying the threats may potentially link the same threat to different categories.

Some behaviors may be identified as malicious behavior per the policies of a first vendor, but the policies of other vendors may be more relaxed and categorize the detection/behavior as something less serious or not a threat at all. There may be a discrepancy between what behaviors certain industries consider, or do not consider, to be a threat. For instance, some engines may consider a file of a certain name to be a threat, whereas other engines may consider a file of that name to be a different threat or not a threat.

Trained analyzers may be able to determine that company A labels a certain behavior as threat A, whereas company B labels the same behavior as threat B. However, through knowledge of what the file looks like, an analyzer may determine that both companies are referring to the same thing, even through the threats are not labeled the same by both companies. In still further examples, other vendors may simply refer to the threat as something generic, such as malware, but not associate the threat with a family name.

Tokenization may be implemented to indicate how the detection of a vendor is structured, given that each vendor 102-108 may have different threat detection structures. After a target platform and threat name is identified, different types of dictionaries/indexes may be referenced to determine which type of label is associated with the detected threat. The type of label is assigned by each vendor, specifically. For example, if a threat is given a generic name, such as Spider Panda, by a first vendor, even though a second vendor does not use the same name Spider Panda, the threat may still be detected by the second vendor but called something different. Each vendor can have one name or multiple names for a detected threat.

Some vendors reuse various engines developed by other vendors. Thus, the vendors 102-108 illustrated in FIGS. 1A-1D may be selected for analysis based on the vendors 102-108 using different types of engines from each other. That is, if a vendor 5 used the same type of engine as one of the other vendors 102-108, then vendor 5 may optionally be excluded from the analysis, as it would have the same detections as one of the other vendors 102-108. In one example, the engines being used by the vendors 102-108 are each self-developed engines by the respective vendors 102-108.

Referring to the diagram 100 of FIG. 1A, the analysis includes vendor 1 102, vendor 2 104, vendor 3 106, and vendor 4 108, for example. Vendor 1 is associated with a first detection 112a, a second detection 112b, and a third detection 112c. Vendor 2 is associated with a first detection 114a and a second detection 114b. Vendor 3 is associated with a first detection 116a and a second detection 116b. Vendor 4 is associated with a first detection 118a, a second detection 118b, a third detection 118c, and a fourth detection 118d. Hashing may be used to help narrow down/guide the searching of the vendors 102-108 during the threat detection process. For example, the vendors 102-108 may be provided a hash table that stores key and value pairs in a hash list that is accessible to the vendors 102-108 through a table index. In some implementations, the key and value pairs may correspond to a type of label to assign to a specific threat/data. As hashes are detected by the vendors 102-108 from the common hash list, the vendors 102-108 provide the detections 112a-118d illustrated in table 100. Each detection 112a-118d is considered unique to each vendor 102-108, For example, a detection of vendor 1 102 is not the equivalent of any detection of vendor 2 104 or other vendor 106-108. The detections 112a-118d may be associated with metadata identified for the list of hashes, where each detection 112a-118d corresponds to a hash being identified in the data from the list of hashes.

The respective vendors 102-108 perform clustering of the data based on their own detections. Some detections are larger or smaller than other detections, as a result of how much data is being clustered into any specific detection. In the example of diagram 100, vendor 1 102 identified three detections 112a-112c. However, within the three detections 112a-112c there may be ten files included in detection 1 112a, thirty-five files included in detection 2 112b, and twelve files included in detection 3 112c, for example. More generally, the three different types of detections identified by vendor 1 102 may have different amounts of data associated with each detection. A detection occurs when a vendor identifies a hash from the list of hashes. For example, in the diagram 100, vendor 1 102 identifies three hashes corresponding to detections 112a-112c, whereas vendor 2 104 identifies two hashes corresponding to detections 114*a*-114*b*. The detections of vendor 3 106 and vendor 4 108 are associated with similar principles.

Analyzing the collective decision making of all the vendors 102-108 may begin with identifying the cluster that encapsulates the largest segment of data. In the diagram 100, vendor 3 106 has the largest cluster of all the vendors 102-108 at detection 2 116*b* of vendor 3 106.

Referring to the diagram 125 of FIG. 1B, detection 2 of vendor 3 106 is identified as the lead detection 120 for the analysis since it includes the largest amount of data (e.g., the most files of all the detections 112*a*-118*d*). Using the detection that captures the most data allows for reduced computational effort in comparison to performing computations for multiple smaller detections that add up to an equivalent amount of data as the lead detection 120.

Additionally or alternatively to being based on the detection with the most data, the lead detection 120 can also be based on the notoriety the vendor itself. For example, some vendors are known for not producing high value detections. Such vendors may be vetted to eliminate them from being assigned the lead detection 120. Thus, even though detection 2 112*b* of vendor 3 106 includes the largest amount of data, it may not be assigned the lead detection 120 if it does not pass the vetting process. Instead, the next largest detection of another vendor that passes the vetting process may be assigned the lead. Some vendors may even be removed from the analysis altogether to reduce complexities associated with having to identify next largest detections, Other vendors with large clusters may just have generic detections or may be vendors that simply purchase software development kits (SDKs) from other vendors, such that they have the same detections as the other vendors.

Vendor 3 106 is assigned with the lead detection 120 in the diagram 125 because it includes the detection among all the vendors 102-108 with the most amount of data. The data set being analyzed by the multiple vendors 102-108 may be trimmed, as illustrated by the dashed lines in FIG. 1B, to exclude data that falls outside the lead detection 120, as the malicious part of a file oftentimes falls within the range of data covered by the lead detection 120.

Figure 1C:
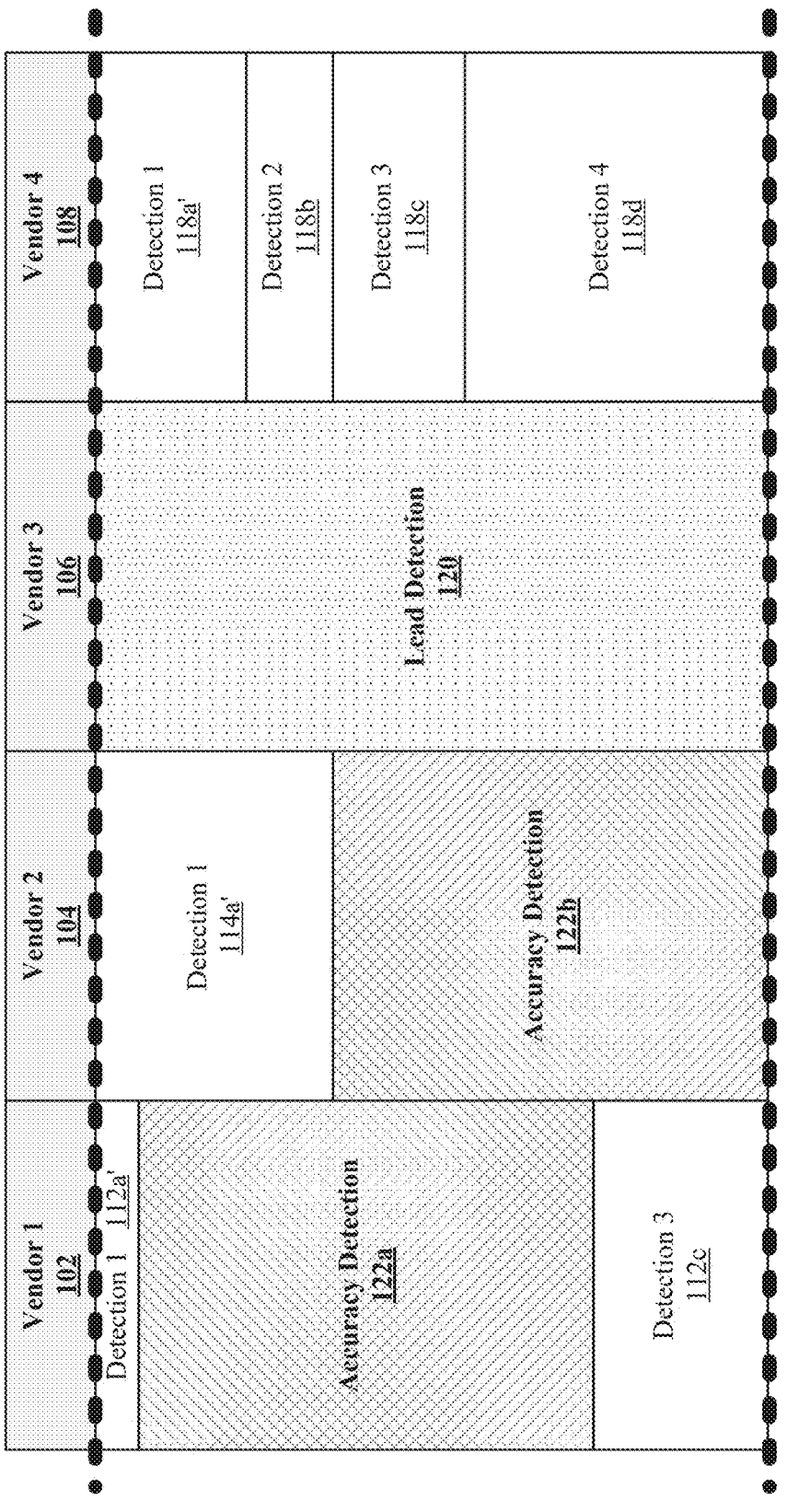

The diagram 150 of FIG. 1C illustrates the trimmed data set. For example, detection 1 112*a* of vendor 1 102 is reduced to detection 1 112*a'*, detection 1 114*a* of vendor 2 104 is reduced to detection 1 114*a'*, and detection 1 118*a* of vendor 4 108 is reduced to detection 1 118*ai*, as a result of trimming the overall dataset to match the size of the lead detection 120 of vendor 3 106. The rules that are generated for malicious indicators based on the various detections 112*a*-118*d* of the various vendors 102-104 should not rely on a single vendor to issue the detection alone, in an automated system, because some vendors may issue too many generic detections, which may cause false positives, or a specific vendor may not be as specialized as other vendors. In other cases, a single vendor may just get the detection wrong.

Accordingly, rule generation techniques should encompass information across a plurality of vendors. While detection 2 116*b* of vendor 3 is assigned the lead detection 120 in the illustrated example, next largest detections of different vendors are used for accuracy detection 122*a*-122*b*. For example, detection 2 112*b* of vendor 1 102 and detection 2 114*b* of vendor 2 104 may be used as accuracy detections 122*a*-122*b*. The accuracy detections 122*a*-122*b* come from different vendors 102-104. If a third detection were to be used for accuracy detection, a next candidate would be detection 4 118*d* of vendor 4, as such detection is the next largest detection of a vendor that is not already being used for lead detection 120 or accuracy detection 122*a*-122*b*. By separating the lead detection 120 and accuracy detection 122*a*-122*b* among the vendors, the analysis is able to more accurately pinpoint the particular type of threat. Such techniques also add more trust to the choice of the lead vendor, as the accuracy detections 122*a*-122*b* are intended to reinforce the indication associated with the lead detection 120.

The data in the accuracy detection 122*a*-122*b* is a subset of the data in the lead detection 120. The cluster that forms the lead detection 120 initially defines the upper and lower boundaries of the dataset, such that the accuracy detections 122*a*-122*b* may be identified within the defined boundaries. For example, the accuracy detections 122*a*-122*b* are the next count of largest clusters, with one per vendor. The count number may be increased or decreased depending on whether the analysis requires more or less accuracy detection clusters. The count starts with the next largest detection from the lead detection 120 and may incrementally decrease in size, or potentially remain the same size, with each count.

The accuracy detections 122*a*-122*b* are assigned to separate vendors because if two accuracy detections were taken from the same vendor, it would correspond to two different threats. Having two threats may cause some confusion about what type of threat is to be detected with the rule that is being generated. The system would have to choose between the two threats, which would result in increased complexity.

Figure 1D:
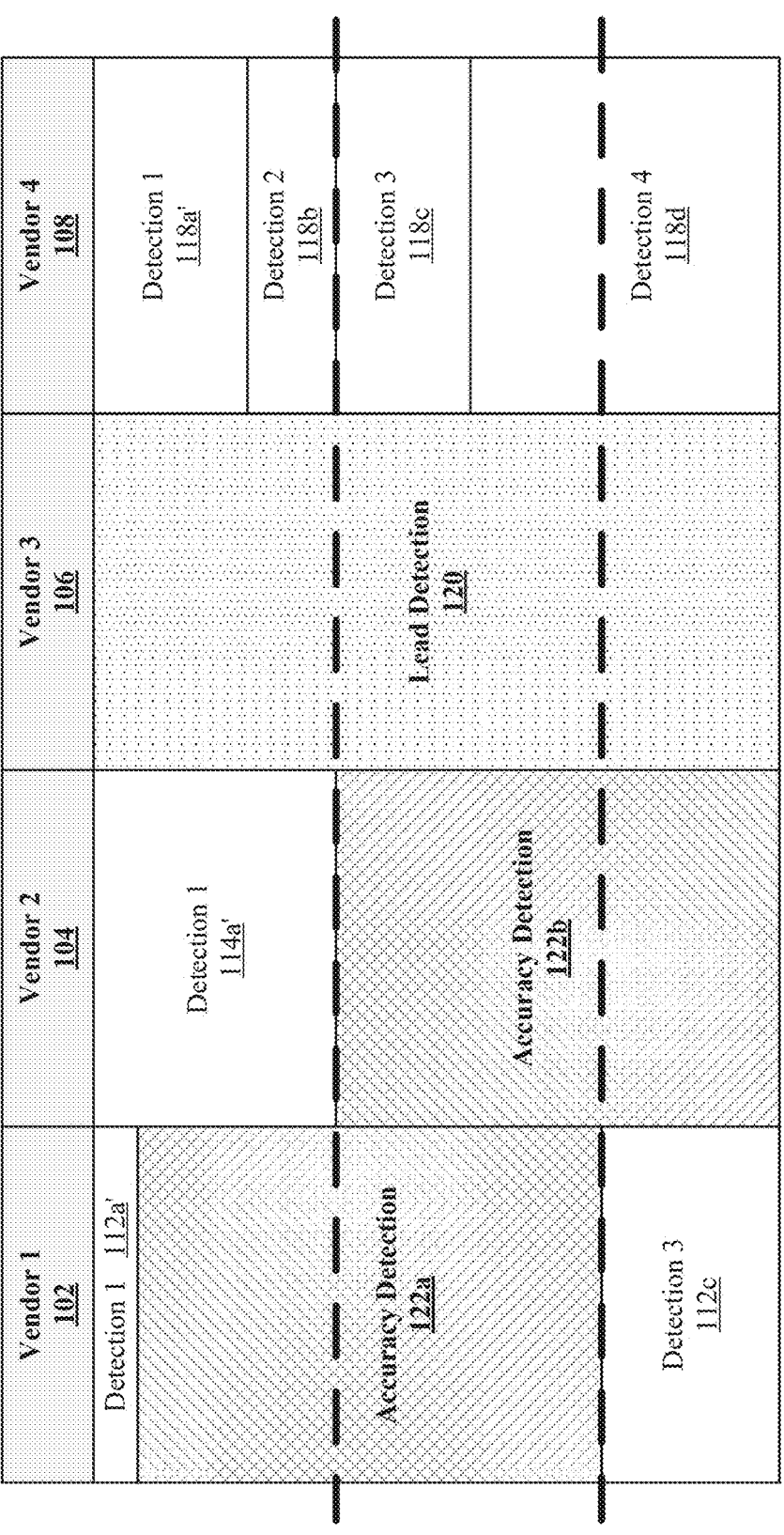

The accuracy detections 122*a*-122*b* also overlap with each other laterally, such that the dataset can be further trimmed for accuracy, as illustrated in the diagram 175 of FIG. 1D. In an example, detection 4 118*d* of vendor 4 108 may be selected as a third accuracy detection because it laterally overlaps with the other accuracy detections 122*a*-122*b* of vendor 1 102 and vendor 2 104. In contrast, detection 1 118*a'* of vendor 4 108 may not be selected as a third accuracy detection because it does not laterally overlap with the other accuracy detections 122*a*-122*b* of vendor 1 102 and vendor 2 104. Each of the vendors 102-108 is analyzing the same set of data for potential threat(s). However, because the vendors 102-108 are all implementing their own different detection engines, the number of detections and the size/amount of data being grouped within each detection is different for each of the vendors 102-108. Accordingly, "overlapping data" as used herein refers to a same subset of data from the overall dataset, regardless of which detection that subset of data happens to fall within for the different vendors 102-108. For example, the bottom portion of accuracy detection 122*a* and the top portion of accuracy detection 122*b*, as delineated between the dashed lines in table 175, is an example of overlapping data (i.e., it is the same subset of data from the larger dataset being analyzed by the vendors 102-108, the larger/overall dataset being represented from the top of table 175 to the bottom of table 175). Since each accuracy detection has to come from a different vendor, the maximum number of accuracy detections that may be used in the example of diagram 175 is three accuracy detections, because after the lead detection 120 is assigned to vendor 3 there are only three remaining vendors 102, 104, 108, from which to select detections as accuracy detections.

FIG. 2 is a diagram 200 illustrating a secondary threat detection analysis for when a lead threat detection analysis is not suitable for malicious indicator rule generation. In some examples, the creditability/reliability of the vendors 102-108 may be weighted, even prior to first performing the lead detection analysis. If vendor 3 106 is determined to be unsuitable for lead detection, either before or after the lead threat detection analysis is performed, another vendor may be assigned the lead role.

The trimmed portion of the dataset from the diagram 175 is used for the secondary threat detection analysis in the diagram 200. The accuracy detection 122a corresponding to detection 2 112b is reduced in size to detection 2 112b'. The lead detection 120 corresponding to detection 2 116b is reduced in size to detection 2 116b'. The size of the remaining detections 112a', 114a, 118a', 118b, are unchanged from the diagram 175. However, with detection 1 114a' of vendor 2 104 being the next largest detection in the remaining dataset, detection 1 114a' of vendor 2 104 is assigned to be the next lead detection 220.

The secondary threat detection analysis of diagram 200 may be implemented when a vendor, such as vendor 3 106, associated with a lead threat detection analysis does not result in a hit or does not pass the vetting process to qualify for lead detection. In other examples, the secondary threat detection analysis may be performed when a vendor initially associated with the lead does not have a suitable detection. A similar procedure is followed for malicious indicator rule generation in the secondary threat detection analysis as is described above with respect to diagrams 100-175 for the lead threat detection analysis.

The secondary threat detection of diagram 200 may also be implemented to verify that the lead threat detection analysis of diagrams 100-175 resulted in an accurate output. For example, if no lead detection is identified in the secondary threat detection analysis, then the lead threat detection analysis likely provided positive results. In contrast, if another lead detection is identified in the secondary threat detection analysis, the accuracy detections may change from the diagrams 150-175. That is, the analysis may be reperformed, based on the diagram 200, in a manner that more broadly targets the threat, such as over a wider range of the dataset.

FIG. 3 is a flow diagram of a method 300 of automatic rule initiation and/or generation for malicious indicators, in accordance with some embodiments of the present disclosure. A description of elements of FIG. 3 that have been previously described will be omitted for brevity. Method 300 may be performed by processing logic that may include hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 300 may be performed by processing device 402 shown in FIG. 4.

With reference to FIG. 3, method 300 illustrates example functions used by various embodiments. Although specific function blocks ("blocks") are disclosed in method 300, such blocks are examples. That is, embodiments are well suited to performing various other blocks or variations of the blocks recited in method 300. It is appreciated that the blocks in method 300 may be performed in an order different than presented, and that not all of the blocks in method 300 have to be performed.

With reference to FIG. 3, method 300 begins at block 310, whereupon processing logic is receiving, from threat detection engines of a plurality of vendor systems, a plurality of threat detection indications for a dataset—each threat detection indication of the plurality of threat detection indications receives a vendor-specific tokenization based on historical data associated with the plurality of vendor systems. In some embodiments, the threat detection engines of the plurality of vendor systems is similar to vendors 102-108 described herein with respect to FIGS. 1A-2. In some embodiments, the plurality of threat detection indications for the dataset is similar to detections 112a-118d described herein with respect to FIG. 1A. In some embodiments, the vendor-specific tokenization refers to tokenizing the detections of a single vendor system (e.g., 112a-112c, and like vendor detection groupings, as described herein with respect to FIG. 1A) according to a vendor-specific schema, which may be based on historical data for the respective vendors 102-108.

At block 320, the processing logic is identifying, from the plurality of threat detection indications, a lead detection from a first vendor system of the plurality of vendor systems and an accuracy detection from at least one second vendor system of the plurality of vendor systems the lead detection and the accuracy detection have overlapping data from the dataset. In some embodiments, the lead detection is similar to the lead detection 120 described herein with respect to FIGS. 1B-1D. In some embodiments, the first vendor system is similar to vendor 1 102 descried herein with respect to FIGS. 1A-2. In some embodiments, the accuracy detection is similar to the accuracy detection 122a-122b described herein with respect to FIGS. 1C-1D. In some embodiments, the at least one second vendor system is similar to at least one of vendor 1 102, vendor 2 104, and/or vendor 4 108 described herein with respect to FIGS. 1A-2. In some embodiments, the overlapping data is similar to portions of the dataset bounded by the dashed lines in FIGS. 1C-1D.

At block 330, the processing logic is generating, by a processing device, a malicious behavior detection procedure based on the lead detection, the accuracy detection, and the vendor-specific tokenization being used to detect a malicious behavior in the dataset. In some embodiments, the malicious behavior is detected within the dataset between the dashed lines in FIG. 1D. In some embodiments, the malicious behavior detection procedure is generated based on the detection described herein with respect to FIG. 1D.

FIG. 4 is a component diagram of an example of a device architecture 400 for automatic rule initiation and/or generation for malicious indicators, in accordance with embodiments of the disclosure. The device architecture 400 includes a computing device 410 having a processing device 402 and memory 404, which may implement the aspects described herein with respect to FIGS. 1A-3.

Referring to FIG. 4, the computing device 410 may receive, from threat detection engines of multiple vendors, threat detection indications 406 for a dataset 408. Each threat detection indication 406 receives a vendor-specific tokenization by a tokenization engine 418 based on historical data 420 associated with the multiple vendors. In some embodiments, the multiple vendors is similar to the vendors 102-108 described herein with respect to FIGS. 1A-2. In some embodiments, the threat detection indications 406 is similar to the detections 112a-118d described herein with respect to FIGS. 1A-2. In some embodiments, the dataset 408 is similar to the data associated with the detections 112a-118d described herein with respect to FIGS. 1A-2.

The computing device 410 identifies, from the threat detection indications 406, a lead detection 412 from a first vendor of the multiple vendors and accuracy detection(s) 414 from at least one second vendor of the multiple vendors. In some embodiments, the lead detection 412 is similar to the lead detection 120 described herein with respect to FIGS. 1B-1D. In some embodiments, the accuracy detection(s) 414 is similar to the accuracy detections 122a-122b described herein with respect to FIGS. 1C-1D.

The lead detection 412 and the accuracy detection(s) 414 have overlapping data in the dataset 408. In some embodiments, the overlapping data in the dataset 408 is similar to portions of the data bounded by the dashed lines in FIGS. 1C-1D.

The detection procedure generator 416 generates, or initiates, using the processing device 402, a malicious behavior detection procedure based on the lead detection 412, the accuracy detection(s) 414, and the vendor-specific tokenization performed by the tokenization engine 418. The detection procedure generator 416 generates, or initiates, the malicious behavior detection procedure to detect a malicious behavior in the dataset 408. In some embodiments, the malicious behavior in the dataset 408 is within data similar to the portions of data bounded by the dashed lines in FIGS. 1C-1D.

Figure 5:
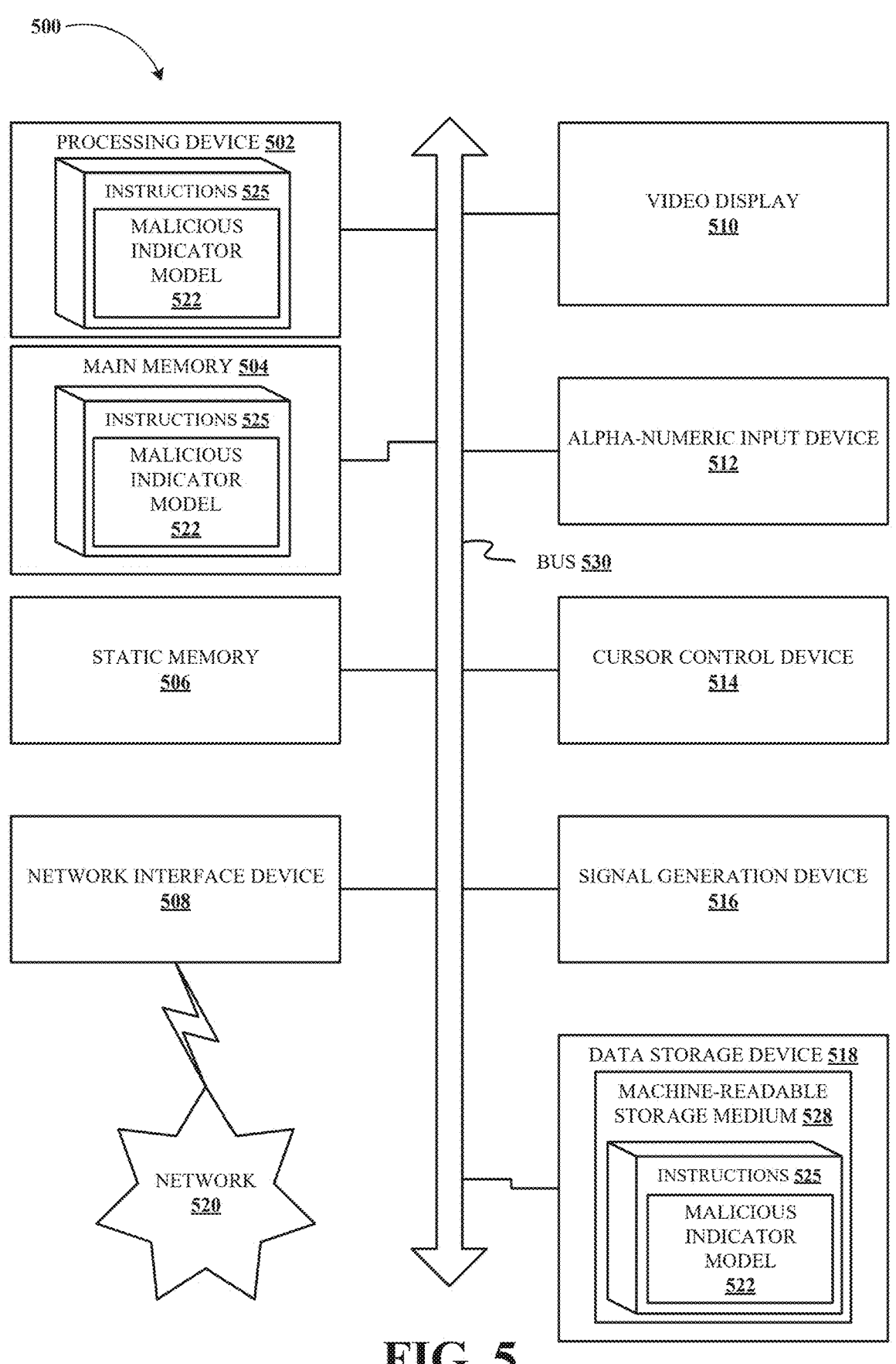
FIG. 5 is a block diagram of an example computing device that may perform one or more of the operations described herein, in accordance with some embodiments of the disclosure.

FIG. 5 is a block diagram of an example computing device 500 that may perform one or more of the operations described herein, in accordance with some embodiments of the disclosure. Computing device 500 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 500 may include a processing device (e.g., a general purpose processor, a PLD, etc.) 502, a main memory 504 (e.g., synchronous dynamic random access memory (DRAM), read-only memory (ROM)), a static memory 506 (e.g., flash memory) and a data storage device 518, which may communicate with each other via a bus 530.

Processing device 502 may be provided by one or more general-purpose processing devices such as a microprocessor, central processing unit, or the like. In an illustrative example, processing device 502 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 502 may also include one or more special-purpose processing devices such as an application specific integrated circuit (ASIC), a field programmable gate array (FPGA), a digital signal processor (DSP), network processor, or the like. The processing device 502 may execute the operations described herein, in accordance with one or more aspects of the present disclosure, for performing the operations and steps discussed herein.

Computing device 500 may further include a network interface device 508 which may communicate with a network 520. The computing device 500 also may include a video display unit 510 (e.g., a liquid crystal display (LCD) or a cathode ray tube (CRT)), an alphanumeric input device 512 (e.g., a keyboard), a cursor control device 514 (e.g., a mouse) and an acoustic signal generation device 516 (e.g., a speaker). In one embodiment, video display unit 510, alphanumeric input device 512, and cursor control device 514 may be combined into a single component or device (e.g., an LCD touch screen).

Data storage device 518 may include a computer-readable storage medium 528 on which may be stored one or more sets of instructions 525 that may include instructions for LLM operations, such as the malicious indicator model 522, for carrying out the operations described herein, in accordance with one or more aspects of the present disclosure. Instructions 525 may also reside, completely or at least partially, within main memory 504 and/or within processing device 502 during execution thereof by computing device 500, main memory 504 and processing device 502 also constituting computer-readable media. The instructions 525 may further be transmitted or received over a network 520 via network interface device 508.

While computer-readable storage medium 528 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "receiving," "identifying," "generating," "initiating," "tokenizing," "selecting," "detecting," "applying," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may include a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a," "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/ component is "configured to" perform one or more tasks, or is "configurable to" perform one or more tasks, is expressly intended not to invoke 35 U.S.C. § 112(f) for that unit/ circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the present disclosure to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the present disclosure is not to be limited to the details given herein, but may be modified within the scope and equivalents of the appended claims.

What is claimed is:

1. A method comprising:
   receiving, from threat detection engines of a plurality of vendor systems, a plurality of threat detection indications for a dataset, each threat detection indication of the plurality of threat detection indications receiving a vendor-specific tokenization based on historical data associated with the plurality of vendor systems;
   identifying, from the plurality of threat detection indications;
      a lead detection from a first vendor system of the plurality of vendor systems, wherein the lead detection comprises a threat detection indication from the plurality of threat detection indications having a largest amount of data from the dataset; and
      an accuracy detection from at least one second vendor system of the plurality of vendor systems, wherein the accuracy detection comprises another threat detection indication from the plurality of threat detection indications having a next largest amount of data from the dataset, and wherein the lead detection and the accuracy detection have overlapping data from the dataset; and
   generating, by a processing device, a malicious behavior detection procedure based on the lead detection, the accuracy detection, the overlapping data from the dataset, and the vendor-specific tokenization being used to detect a malicious behavior in the dataset.

2. The method of claim 1, further comprising:
   tokenizing the plurality of threat detection indications into component parts including at least one of: a modifier, a threat type, a family, or a variant.

3. The method of claim 2, wherein at least one of: the modifier corresponds to an operating system type, the threat type corresponds to a malware type, the family corresponds to a name of a threat, or the variant corresponds to a version or subversion of the family.

4. The method of claim 1, wherein the vendor-specific tokenization for a first threat detection indication of the first vendor system is associated with a different tokenization scheme than implemented for a second threat detection indication of the least one second vendor system.

5. The method of claim 1, further comprising:
   selecting one or more additional accuracy detections from the plurality of threat detection indications, each of the one or more additional accuracy detections being from a different second vendor system than each other, and having overlapping data with the lead detection.

6. The method of claim 5, wherein each of the accuracy detections includes a larger amount of data from the dataset than any other threat detection indication from the corresponding second vendor system.

7. The method of claim 1, further comprising:
   detecting, from the plurality of threat detection indications, the malicious behavior in the dataset, the malicious behavior being within the overlapping data of the lead detection from the first vendor system and the accuracy detection from the at least one second vendor system.

8. The method of claim 1, further comprising:

applying, to a different set of data, the malicious behavior detection procedure generated for the dataset.

9. A system comprising:

a processing device; and a memory to store instructions that, when executed by the processing device cause the processing device to:

receive, from threat detection engines of a plurality of vendor systems, a plurality of threat detection indications for a dataset, each threat detection indication of the plurality of threat detection indications receiving a vendor-specific tokenization based on historical data associated with the plurality of vendor systems;

identify, from the plurality of threat detection indications;

a lead detection from a first vendor system of the plurality of vendor systems, wherein the lead detection comprises a threat detection indication from the plurality of threat detection indications having a largest amount of data from the dataset, and an accuracy detection from at least one second vendor system of the plurality of vendor systems, wherein the accuracy detection comprises another threat detection indication from the plurality of threat detection indications having a next largest amount of data from the dataset, and wherein the lead detection and the accuracy detection have overlapping data from the dataset; and generate, by a processing device, a malicious behavior detection procedure based on the lead detection, the accuracy detection, the overlapping data from the dataset, and the vendor-specific tokenization being used to detect a malicious behavior in the dataset.

10. The system of claim 9, wherein the processing device is further to:

tokenize the plurality of threat detection indications into component parts including at least one of: a modifier, a threat type, a family, or a variant.

11. The system of claim 10, wherein at least one of: the modifier corresponds to an operating system type, the threat type corresponds to a malware type, the family corresponds to a name of a threat, or the variant corresponds to a version or subversion of the family.

12. The system of claim 9, wherein the vendor-specific tokenization for a first threat detection indication of the first vendor system is associated with a different tokenization scheme than implemented for a second threat detection indication of the least one second vendor system.

13. The system of claim 9, wherein the processing device is further to:

select one or more additional accuracy detections from the plurality of threat detection indications, each of the one or more additional accuracy detections being from a different second vendor system than each other having overlapping data with the lead detection.

14. The system of claim 9, wherein the processing device is further to:

detect, from the plurality of threat detection indications, the malicious behavior in the dataset, the malicious behavior being within the overlapping data of the lead detection from the first vendor system and the accuracy detection from the at least one second vendor system.

15. The system of claim 9, wherein the processing device is further to:

apply, to a different set of data, the malicious behavior detection procedure generated for the dataset.

16. A non-transitory computer-readable storage medium including instructions that, when executed by a processing device, cause the processing device to:

receive, from threat detection engines of a plurality of vendor systems, a plurality of threat detection indications for a dataset, each threat detection indication of the plurality of threat detection indications receiving a vendor-specific tokenization based on historical data associated with the plurality of vendor systems;

identify, from the plurality of threat detection indications:

a lead detection from a first vendor system of the plurality of vendor systems, wherein the lead detection comprises a threat detection indication from the plurality of threat detection indications having a largest amount of data from the dataset; and an accuracy detection from at least one second vendor system of the plurality of vendor systems, wherein the accuracy detection comprises another threat detection indication from the plurality of threat detection indications having a next largest amount of data from the dataset, and wherein the lead detection and the accuracy detection have overlapping data from the dataset; and generate, by the processing device, a malicious behavior detection procedure based on the lead detection, the accuracy detection, the overlapping data from the dataset, and the vendor-specific tokenization being used to detect a malicious behavior in the dataset.

* * * * *